UNITED STATES PATENT OFFICE.

WILLIAM D. PATTEN, OF NEW YORK, N. Y.

PROCESS OF MAKING CAKES OF BICARBONATE OF SODA.

SPECIFICATION forming part of Letters Patent No. 636,448, dated November 7, 1899.

Application filed April 21, 1898. Serial No. 678,336. (No specimens.)

*To all whom it may concern:*

Be it known that I, WILLIAM D. PATTEN, a citizen of the United States, and a resident of New York, (Brooklyn,) in the county of Kings and State of New York, have invented a certain new and Improved Process of Manufacturing Cakes of Bicarbonate of Soda, of which the following is a specification.

This invention relates to the production of bicarbonate of soda in the form of small rigid cakes, whereby the bicarbonate of soda is produced in a convenient form suitable for immediate use in the market for generating carbonic acid in malt and spirituous liquors or in other effervescent liquids.

In carrying out my process I take moist carbonate of soda in a loose state and form it into small cakes of suitable size. I prefer in general to make the cakes in sizes of one-half ounce, one ounce, or two ounces, because cakes containing such quantities are those generally required at present in the market. They may, however, be made smaller or somewhat larger, if required, and of any desired shape without departing from my invention. The cohesion of the carbonate of soda is such that only slight pressure is required to form the cakes. Great pressure, which would tend to diminish the efficiency and solubility of the final product, is not required. At this stage, however, the cakes crumble easily and are not sufficiently rigid to admit of transportation and the rough handling to which their use subjects them. They require to be subjected to a further treatment in the process, whereby the cakes become rigid or hardened to the proper degree. This second step consists in subjecting the formed cakes of carbonate of soda to the action of carbonic-acid gas, which effects two important changes in the cakes. The carbonic-acid gas acts chemically upon the cakes of carbonate of soda and converts them into bicarbonate of soda, the product desired. It also gives to the cakes the required rigidity, so that they may be transported and handled without damage. The cakes when finished are porous and readily soluble and are in condition to be immediately put to the ultimate use for which they are intended in the market.

It will be seen that my process does not require the cakes to be treated with steam, as has heretofore been proposed, for the purpose of forming a compact crust or shell inclosing the body of the cake. Such shell has a tendency to check the dissolution of the cake when used. Moreover, my process does not require the employment of gum or other glutinous adulterants heretofore proposed to cement the active material in the form in which it is desired to retain it, and it effects a considerable saving in the cost of producing the cakes as compared with the processes heretofore in use. In fact, I am able to produce my cakes ready for their ultimate use at substantially the same cost as that of the bicarbonate of soda heretofore used as the raw material from which cakes have been manufactured by prior processes.

In forming the cakes of bicarbonate of soda as above described the carbonate of soda used must contain a suitable amount of moisture—that is, an amount sufficient not only to supply the requirements of the chemical reaction, but also sufficient to compensate for the loss of moisture driven off during such chemical reaction. At the same time it is best to avoid an oversupply of moisture in the carbonate of soda, such as would occasion an undue dripping during the charging process.

What I claim as new is—

The process of producing bicarbonate of soda in small rigid cakes of a size suitable for immediate use for their ultimate purpose in the market, which consists in forming carbonate of soda containing a suitable amount of moisture into individual cakes of the required size and then subjecting said cakes to the action of carbonic-acid gas, whereby the individual cakes of carbonate of soda are converted into individual cakes of bicarbonate of soda of substantially uniform porosity and the cakes are simultaneously made rigid, so that the cakes are adapted for immediate transportation and use.

In testimony whereof I have signed my name to this specification in the presence of two subscribing witnesses.

WILLIAM D. PATTEN.

Witnesses:
JAS. C. HOWELL,
SIDNEY MANN.